United States Patent
Hiben et al.

(10) Patent No.: US 10,873,951 B1
(45) Date of Patent: Dec. 22, 2020

(54) METHOD AND DEVICE TO MINIMIZE INTERFERENCE IN A CONVERGED LMR/LTE COMMUNICATION DEVICE

(71) Applicant: MOTOROLA SOLUTIONS, INC, Chicago, IL (US)

(72) Inventors: Bradley M Hiben, Glen Ellyn, IL (US); Bruce D Mueller, Palatine, IL (US); John B Preston, Plantation, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/430,999

(22) Filed: Jun. 4, 2019

(51) Int. Cl.
| | |
|---|---|
| *H04W 4/00* | (2018.01) |
| *H04W 72/08* | (2009.01) |
| *H04W 72/04* | (2009.01) |
| *H04B 17/318* | (2015.01) |
| *H04W 28/02* | (2009.01) |
| *H04W 76/30* | (2018.01) |

(52) U.S. Cl.
CPC ........ *H04W 72/082* (2013.01); *H04B 17/318* (2015.01); *H04W 28/0257* (2013.01); *H04W 72/0453* (2013.01); *H04W 72/087* (2013.01); *H04W 76/30* (2018.02)

(58) Field of Classification Search
CPC ........... H04W 72/082; H04W 72/0453; H04W 28/0257; H04W 76/30; H04W 72/087; H04B 17/318
USPC .......................................................... 370/329
See application file for complete search history.

(56) References Cited

U.S. PATENT DOCUMENTS

| | | | |
|---|---|---|---|
| 5,953,665 | A | 9/1999 | Mattila |
| 7,016,319 | B2 | 3/2006 | Baum et al. |
| 7,366,471 | B1 | 4/2008 | Kitchin |
| 7,664,465 | B2 | 2/2010 | Shen et al. |

(Continued)

FOREIGN PATENT DOCUMENTS

| | | |
|---|---|---|
| EP | 1 261 228 A2 | 11/2002 |
| EP | 1 388 951 A2 | 2/2004 |

(Continued)

OTHER PUBLICATIONS

Motorola, Co-existence study involving PSNB system, Jan. 17-19, 2012 (From Applicant's IDS) (Year: 2012).*

(Continued)

*Primary Examiner* — Mang Hang Yeung
(74) *Attorney, Agent, or Firm* — John B. MacIntyre

(57) ABSTRACT

A method and converged LMR/LTE communications device provide for minimizing interference in the converged LMR/LTE communications device that operates in a land mobile radio (LMR) narrowband communication system and a long term evolution (LTE) broadband communication system. The converged LMR/LTE communications device detects, using an electronic processing device, that the converged LMR/LTE communications device is operating in the first LTE band and the first LMR band. The converged LMR/LTE communications device determines that a first LMR received signal strength indicator (RSSI) at the converged LMR/LTE communications device is less than a first LMR threshold signal strength and disables at least one LTE application based upon the first LMR RSSI being less than the LMR threshold signal strength.

20 Claims, 6 Drawing Sheets

(56) References Cited

U.S. PATENT DOCUMENTS

| | | |
|---|---|---|
| 7,848,221 B2 | 12/2010 | Ding et al. |
| 8,098,639 B2 | 1/2012 | McDonald et al. |
| 8,107,880 B2 | 1/2012 | Okker et al. |
| 8,340,580 B1 | 12/2012 | Epstein |
| 8,346,171 B1 | 1/2013 | Mack |
| 8,437,361 B2 | 5/2013 | Guo et al. |
| 8,520,544 B2 | 8/2013 | Aguirre et al. |
| 8,526,410 B2 | 9/2013 | Li et al. |
| 8,588,699 B2 | 11/2013 | Park et al. |
| 8,594,576 B2 | 11/2013 | Palanki |
| 8,655,304 B2 | 2/2014 | Makhlouf et al. |
| 8,676,216 B2 | 3/2014 | Zhou et al. |
| 8,681,660 B2 | 3/2014 | Xu et al. |
| 8,830,985 B2 | 9/2014 | Xu et al. |
| 9,008,020 B2 | 4/2015 | Yacobi et al. |
| 9,078,275 B2 | 7/2015 | Ko et al. |
| 2001/0016499 A1 | 8/2001 | Hamabe |
| 2004/0203667 A1 | 10/2004 | Schroeder et al. |
| 2005/0096062 A1 | 5/2005 | Ji et al. |
| 2006/0188003 A1 | 8/2006 | Larsson |
| 2007/0264940 A1 | 11/2007 | Ho et al. |
| 2008/0019334 A1 | 1/2008 | Adams et al. |
| 2008/0108363 A1 | 5/2008 | Yu et al. |
| 2008/0279130 A1 | 11/2008 | Lewis |
| 2009/0147763 A1 | 6/2009 | Desai et al. |
| 2009/0225717 A1 | 9/2009 | Banerjea |
| 2010/0054158 A1 | 3/2010 | Mathai et al. |
| 2010/0159972 A1 | 6/2010 | Cho et al. |
| 2010/0197235 A1 | 8/2010 | Wilhelmsson |
| 2010/0304705 A1 | 12/2010 | Hursey |
| 2010/0304770 A1 | 12/2010 | Wiefeldt et al. |
| 2011/0047230 A1 | 2/2011 | McGee |
| 2011/0110255 A1 | 5/2011 | Park et al. |
| 2011/0136497 A1 | 6/2011 | Youtz et al. |
| 2011/0176497 A1 | 7/2011 | Gopalakrishnan |
| 2011/0319148 A1 | 12/2011 | Kinnebrew et al. |
| 2012/0020256 A1 | 1/2012 | Tujkovic et al. |
| 2012/0040715 A1 | 2/2012 | Fu et al. |
| 2012/0327869 A1 | 2/2012 | Fiore, III et al. |
| 2012/0052954 A1 | 3/2012 | Zhu et al. |
| 2012/0071106 A1 | 3/2012 | Kadous et al. |
| 2012/0082140 A1 | 4/2012 | Lin et al. |
| 2012/0100860 A1 | 4/2012 | Lei et al. |
| 2012/0164948 A1 | 6/2012 | Narisimha et al. |
| 2012/0231887 A1 | 9/2012 | Lee et al. |
| 2012/0314598 A1 | 12/2012 | Sadek et al. |
| 2013/0183904 A1 | 7/2013 | Hiben et al. |
| 2014/0036696 A1 | 2/2014 | Lee et al. |
| 2014/0129130 A1 | 5/2014 | Kuramura et al. |
| 2014/0171062 A1* | 6/2014 | Fallgren ............... H04W 40/22 455/422.1 |
| 2014/0243041 A1 | 8/2014 | Zhao et al. |
| 2015/0180639 A1 | 6/2015 | Scribano et al. |
| 2015/0288566 A1 | 10/2015 | Sadek |
| 2016/0157134 A1* | 6/2016 | Kordianowski ........ H04W 4/08 455/518 |

FOREIGN PATENT DOCUMENTS

| | | |
|---|---|---|
| EP | 2015462 A1 | 1/2009 |
| EP | 2 186 265 A1 | 5/2010 |
| EP | 2837118 A1 | 2/2015 |
| WO | 2010080669 A3 | 7/2010 |
| WO | 2010141448 A1 | 12/2010 |
| WO | 2010147719 A1 | 12/2010 |
| WO | 2011017577 A2 | 2/2011 |
| WO | 2011119750 A1 | 9/2011 |
| WO | 2011123582 A1 | 10/2011 |
| WO | 2012057590 A2 | 5/2012 |

OTHER PUBLICATIONS

Chiasserini C.F. and Rao R.R. et al., "Coexistence mechanishms for interference mitigation between IEEE 802.11 WLANs and Bluetooth," Twenty-First Annual Joint Conference of the IEEE Computer and Communications Societies. INFOCOM 2002 Proceedings, IEEE vol. 2, pp. 590-598.

Motorola Solutions : "B26 Uplink LTU UE TO PS BS Co-Existence," 3GPP Draft; R4-113745 B26 UL LTE TO PS Co-Existence, 3rd Generation Partnership Project (3GPP) Mobile Competence Centre, Sophia-Antipolis Cedex, France, Jun. 22, 2011, pp. 1-6.

Motorola Solutions: "Co-Existence Study Involving PSNB Systems," 3GPP Draft; R4-B26AH-0043 PSNB Co-Existence, 3rd Generation Partnership Project (3GPP) Mobile Competence Centre, Sophia-Antipolis Cedex, France, Jan. 1, 2012, pp. 1-4.

The International Search Report and the Written Opinion corresponding patent application No. PCT/US2020/031461 filed May 5, 2020, dated Aug. 6, 2020, all pages.

* cited by examiner

METHOD AND DEVICE TO MINIMIZE INTERFERENCE IN A CONVERGED LMR/LTE COMMUNICATION DEVICE

BACKGROUND OF THE INVENTION

The present invention relates generally to mobile devices, which are also called Mobile Stations (MS) in cellular system terminology or User Equipment (UE) in cellular systems specified by the Third Generation Partnership Project (3GPP) or Portable Devices or even just Portables in Land Mobile Radio (LMR) community. In particular, certain mobile devices, commonly referred to as converged communication devices, or simply converged devices, can operate on multiple communication systems, even communication systems that utilize different portions of the RF spectrum. These mobile devices can utilize, for example, Land Mobile Radio (LMR) for voice communications and cellular Long Term Evolution (LTE) for data communications.

However, utilizing these two RF bands can result in interference, which can hamper communications and even prevent usable communication from occurring. This problem can be worse when the LMR signal is weak, especially in correspondence with certain LTE frequency bands.

Therefore, a need exists for a method and system to minimize interference in a converged communications device. More particularly, a need exists for a method and system to minimize interference in a converged communications device that operates in an LMR narrowband communication system and an LTE broadband communication system.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
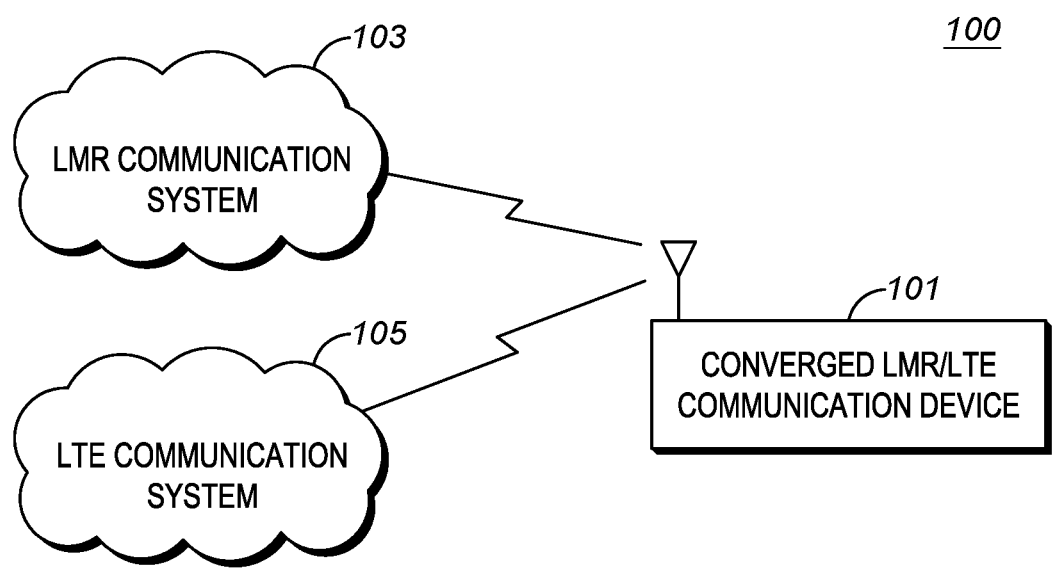
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with an exemplary embodiment, data flow and data rate of an LTE modem are modified based upon channel conditions. For example, LTE applications can be enabled or disabled according to channel conditions. Applications that cause low amounts of interference, such as location update messages, are preferably enabled under more channel conditions than applications that generate a high amount of interference, such as streaming video. As a result, LTE and LMR can be operated simultaneously over at least a part of the coverage area rather than in strict exclusion of one or the other.

Factors taken into consideration when determining whether to slow or stop some or all LTE data transfers include the LTE RSRP (Reference Symbol Receive Power), the LMR RSSI (Receive Signal Strength Indicator), the LTE Band, and the LMR channel. In accordance with exemplary embodiments, the LTE bands impacted are bands 5, 13, and 14. As channel conditions improve, additional applications are preferably enabled. The combination of LMR band, LTE band, signal strength, transmit power, as well as data transmission characteristics are each inputs into a function to preferably predict interference likelihood.

In a further exemplary embodiment, the data rate is controlled using Quality of Service (QoS) priority to data streams from applications to prioritize their transmission.

In accordance with an exemplary embodiment, all applications are allowed regardless of channel conditions for LTE bands 2,4 and 12, since these LTE bands typically do not interfere with LMR radio frequencies.

FIG. 1 depicts a system diagram of a communication system 100 in accordance with an exemplary embodiment of the present invention. Communication system 100 preferably includes a converged LMR/LTE communication device 101, an LMR narrowband communication system 103, and an LTE broadband communication system 105.

Converged LMR/LTE communication device 101 is coupled with LMR narrowband communication system 103, and an LTE broadband communication system 105. Converged LMR/LTE communication device 101 is sometimes referred to as a subscriber unit. It should be understood that communication system 100 would typically include a plurality of communication devices, but only one, converged LMR/LTE communication device 101 is depicted in FIG. 1 for clarity.

LMR narrowband communication system 103 is a person-to-person voice communication system comprising two-way radio transceivers which can be mobile, installed in vehicles, or portable. LMR communication networks are widely used by public safety and first responder organizations such as police, fire, and ambulance services, and other governmental organizations. LMR narrowband communication system 103 can alternately be designed for private commercial use. Most LMR communication networks are half-duplex, with multiple mobile devices sharing a single radio channel, so only one mobile device can transmit at a time. The mobile device is normally in receiving mode so the user can hear other radios on the channel. When a user wants to talk, for example in a talkgroup call, the user presses a push to talk button on his mobile device, which turns on the transmitter of the mobile device. LMR narrowband communication system 103 preferably includes dispatch consoles, data applications, and RF conventional or trunked sites. LMR narrowband communication system 103 includes various network elements that assist in facilitating communication, such as base stations and controllers, but they are not shown for clarity purposes.

LTE broadband communication system 105 is a cellular network that supports packet switching over an-IP network. LTE broadband communication system 105 preferably includes System Architecture Evolution (SAE), which includes an Evolved Packet Core (EPC) network. Together LTE and SAE comprise the Evolved Packet System (EPS). LTE broadband communication system 105 also preferably comprises an eNodeB (evolved node B), an MME (Mobile Management Entity), an HSS (Home Subscriber Server), an SGW (Serving GateWay), and a PGW (Packet data network GateWay).

Figure 2:
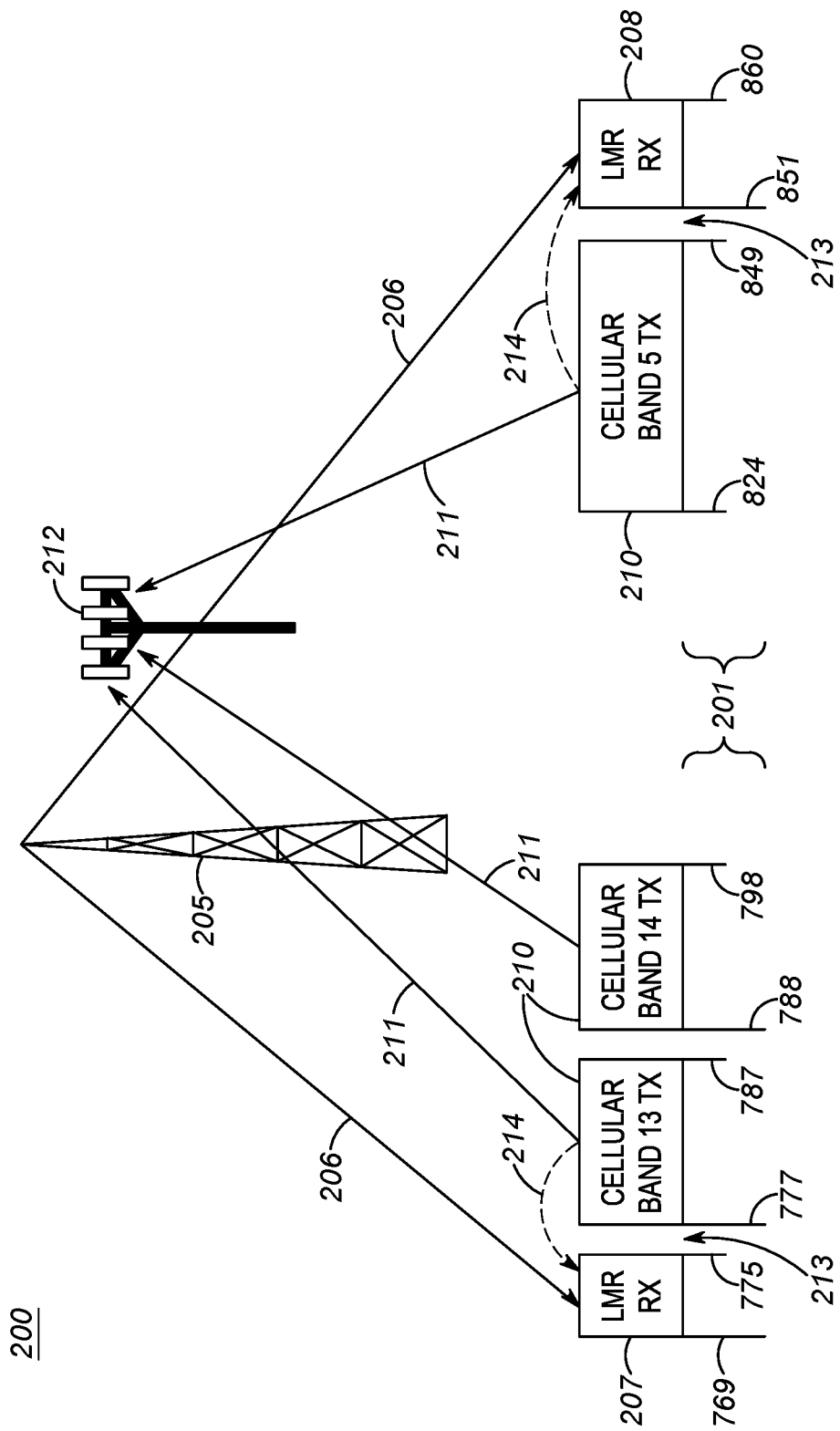
FIG. 2 depicts the spectrum environment of the communication system in accordance with an exemplary embodiment of the present invention.

FIG. 2 depicts the spectrum environment 200 that results in interference from LTE to LMR. The environment shown is specifically a portion of the U.S. 700 MHz and 800 MHz frequency bands which are used for LMR and cellular services. LMR channels typically use narrow bandwidth technologies such as APCO Project 25 that use 25 kHz or 12.5 kHz channels. The cellular bands employ several technologies but are shifting to LTE over time. The frequency limits of the various service allocations are shown by the numbers 201 which are given in MHz.

FIG. 2 shows that an exemplary LMR communication system 103 utilizes base stations at tower site 205 that transmits signals 206 on frequencies in LMR receive bands 207 and 208. At the same time, LTE transmitters in transmit bands 210 transmit LTE signals 211 to a cellular site 212. The LMR receivers can preferably receive signals 206 weaker than −110 dBm while the LTE transmitters can preferably transmit signals 211 at power levels up to +23 dBm. In this exemplary embodiment, the frequency gap 213 between LMR receive and LTE transmit bands is only 2 MHz wide, which is not enough for practical filters to attenuate out of band emissions 214 sufficiently to eliminate interference from the LTE transmitters to the LMR receivers in converged device 101.

Figure 3:
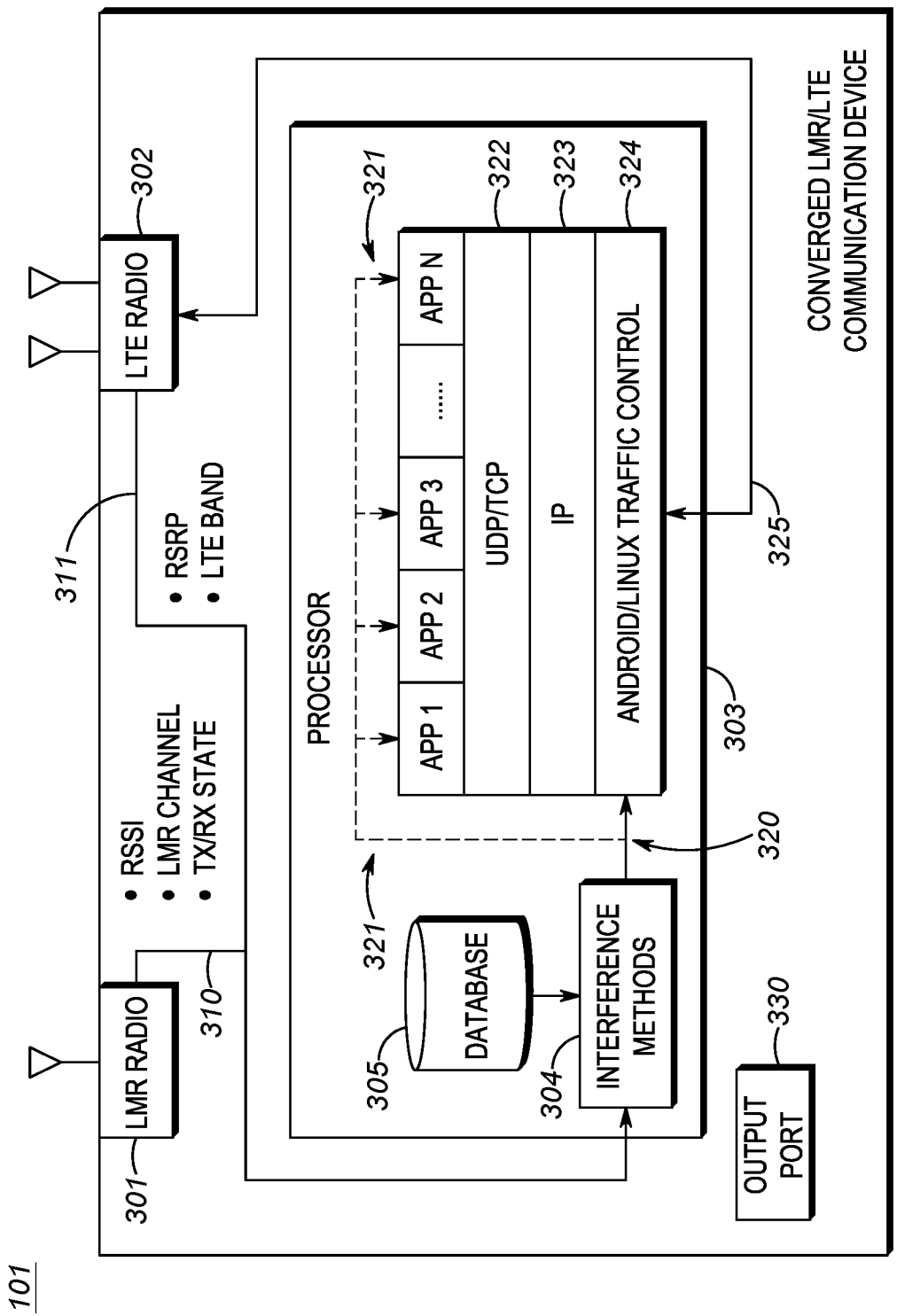
FIG. 3 depicts a schematic of a converged communication device in accordance with an exemplary embodiment of the present invention.

FIG. 3 shows converged communication device 101 in accordance with an exemplary embodiment. LMR radio 301 and LTE radio 302 are used give converged communication device 101 wireless connectivity to systems 103 and 105. Systems 103 and 105 provide many services, such as Internet connectivity and voice dispatch service. LMR and LTE radios are well known in the art and are available as modules and chipsets. Radios 103 and 105 are used to send and receive data from output port 330, which represents the user interface of converged communication device 101 which may use audio, visual, other wireless protocols such as Wi-Fi and Bluetooth, button pushes, knob and switch positions, haptics and screen touches to provide media to the user and receive media and control information from the user.

LMR Radio 301 receives electronic signals from one or more wired or wireless communication networks, such as LMR narrowband communication system 103 and LTE broadband communication system 105, or from other communication devices.

Converged communication device 101 preferably includes processor 303 which executes methods to minimize interference in converged LMR/LTE communications device 101. Processor 303 may include a microprocessor, application-specific integrated circuit (ASIC), field-programmable gate array, or another suitable electronic device. The processor preferably includes a database 305 that can include one or more non-transitory computer-readable media, and may include a program storage area and a data storage area. The program storage area and the data storage area can include combinations of different types of memory, as described herein. In the embodiment illustrated, database 304 stores, among other things, instructions for the processor to carry out the methods.

The processor executes applications 321 that provide useful content and functions for the device user. Examples of applications are location update, voice command, image transfer, streaming voice, streaming video and firmware download. The applications utilize a communications stack provided by processor 303 which preferably includes a UDP/TCP layer 322 and an IP layer 323. A traffic control function 324 is provided by the operating system which may be Android or another suitable mobile operating system. The traffic control function can limit throughput in general or to individual UDP/TCP ports and thus reduce or even stop traffic from going to the LTE radio 302 over interface 325.

The traffic control function responds to input 320 from interference methods block 304. Interference methods block 304 preferably determines the throughput to allow in response to input 310 from the LMR radio and input 311 from the LTE radio. Input 310 may comprise a received signal strength indication (RSSI) that indicates the signal strength of the desired LMR signal. In addition, input 310 may include the frequency of the LMR channel that is being received and the whether the LMR radio is receiving call or transmitting. Input 311 may include the reference symbol received power (RSRP), which is used by the transmitter power control circuit of the LTE radio. In addition, input 311 may include the band that the LTE radio is using at the present time. Inputs 310 and 311 are used in interference method 304 along with information stored in database 304 to determine the throughput that the traffic control function shall allow such that interference from LTE transmissions are reduced to an acceptable level.

In an alternative exemplary embodiment, interference methods 304 activates and deactivates applications over interface 321 rather than limiting throughput with traffic control. In this case, database 305 stores information about each application and the degree of interference produced given the values of inputs 310 and 311 and activates only the applications that can send data over LTE without resulting in unacceptable interference. In this exemplary embodiment, interface 320 is not used.

In either case, the interference is controlled without directly controlling the MAC or PHY layers of either LMR radio 301 or LTE radio 302. On the contrary, the interference is reduced by control of the data input to LTE radio 302 responsive to the channel conditions of the radio paths as represented by signals 310 and 311.

Figure 4:
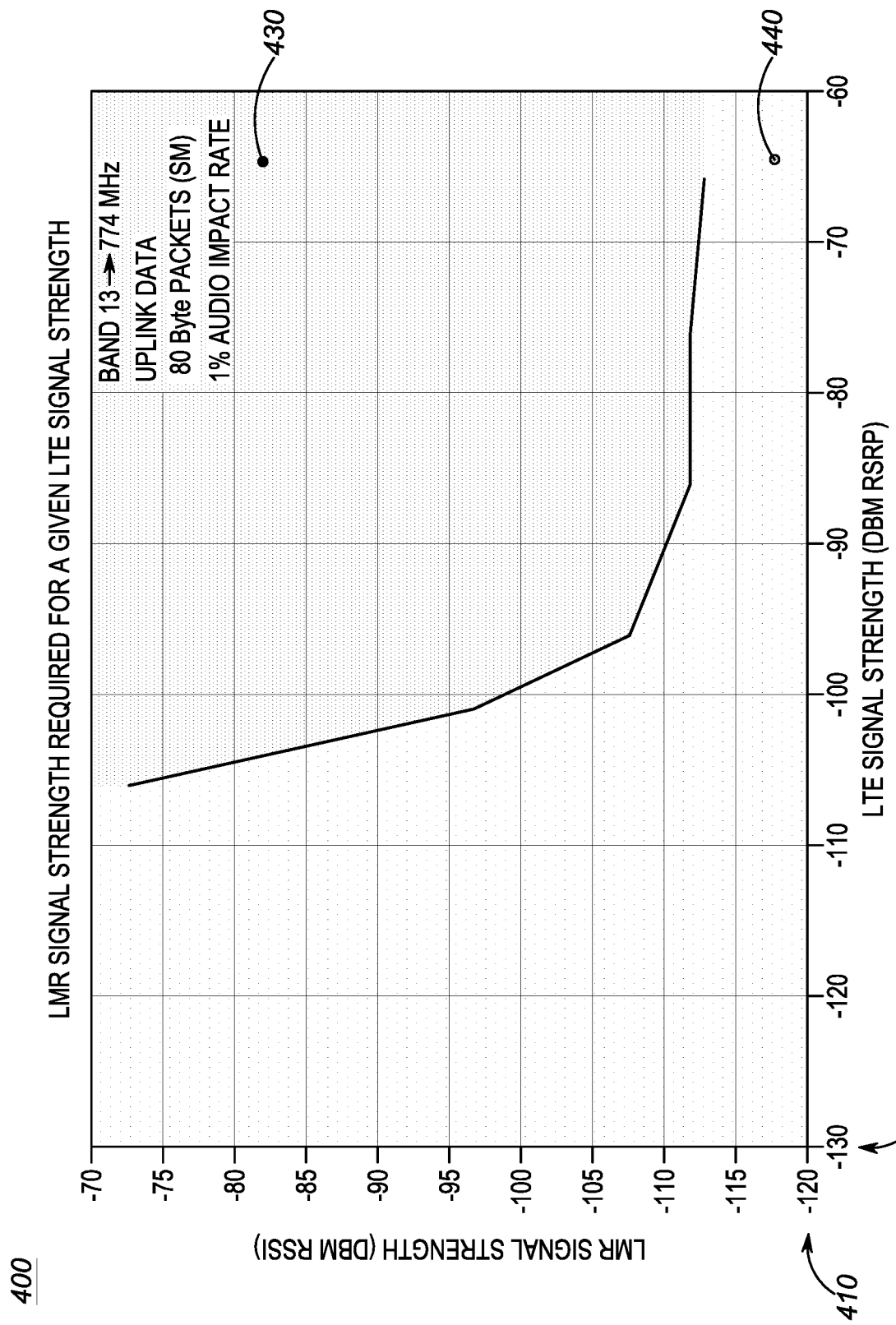
FIG. 4 depicts a graph in accordance with an exemplary embodiment of the present invention.

FIG. 4 depicts a graph 400 in accordance with an exemplary embodiment of the present invention. Graph 400 depicts the LTE Signal Strength along X axis 410 and the LMR Signal Strength along Y axis 420. In the exemplary embodiment depicted in FIG. 4, the LTE Signal Strength and the LMR Signal Strength are measured in dBm. In the exemplary embodiment depicted in FIG. 4, the LMR frequency is 774 MHZ and the LTE band is Band 13. Graph 400 shows the LMR signal strength required for a given set of parameters. In an exemplary embodiment, these parameters include the LMR frequency, the LTE band, an LTE data profile, and LMR/LTE antenna coupling. It should be understood that a similar graph can be produced with any set of parameters listed above.

It should be understood that the RSSI and RSRP are indications of the received signal strength. Therefore, a higher signal strength received generally means that the mobile device is near the base station. Since the mobile device is located near the base station, the power needed to transmit a signal to the base station is relatively low when the received strength is high. Conversely, when the received signal strength is low, the mobile device is most likely not near the base station, and will correspondingly need to transmit signals to the base station at a relatively high power.

Graph 400 is preferably created by utilizing a testing converged LMR/LTE communication device. In accordance with an exemplary embodiment, the testing converged LMR/LTE communication device is programmed for the LMR frequency and the LTE band being evaluated. In this exemplary embodiment, the testing converged LMR/LTE communication device is testing uplink data utilizing eighty byte packets, such as short messages. For each LMR RSSI and LTE RSRP, the point at which a 1% audio impact rate is plotted on the graph. This process is repeated a sufficient number of times such that a threshold line 450 can be generated.

Threshold line 450 separates two ranges, interference range 440 and noninterference range 430, from each other. When a converged device, such as converged LMR/LTE communication device 101, is within noninterference range 430 LTE transmissions could be transmitted without modification. When converged device, such as converged LMR/LTE communication device 101, is within interference range 440, the bit rate for transmissions from converged LMR/LTE communication device 101 are decreased. In a first exemplary embodiment, the bit rate is decreased to zero by blocking all LTE transmissions from converged LMR/LTE communication device 101. In a second exemplary embodiment, certain LTE applications are disabled while others remain enabled, thereby decreasing the transmission bit rate for converged LMR/LTE communication device 101. In a third exemplary embodiment, the transmission bit rate for LTE transmission of converged LMR/LTE communication device 101 is decreased. By decreasing the LTE transmission bit rate, the interference present for LMR communications is lowered. This is especially important for LMR voice, since LMR voice may be used for public safety voice communications, and it is extremely disadvantageous to have interference disrupting such important voice communications.

In accordance with an exemplary embodiment, a set of graphs similar to graph 400 are used. In this exemplary embodiment, the additional graphs would be for the used LMR frequency and LTE band and would preferably go from full data rate LTE to a minimum useable data rate, with a plurality of data rates between full data rate and the minimum useable data rate. An exemplary set of graphs may include graphs for LMR frequencies 769 MHz, 772 MHz, 774 MHz, 775 MHz with LTE bands 13 and 14, LMR frequencies of 851 MHz, 852 MHz 854 MHz, 857 MHz and 860 MHz with LTE band 5, data profiles of 80 byte messages (Small Messages application), 15 kilobyte messages (such as a voice based inquiry system), 130 kilobyte message (such as an Image Transfer application), fifty 80 byte packets-per-second (such as a Voice Streaming uplink application), thirty 1500 byte packets-per-second (such as a Video Streaming uplink application), 10 Megabyte download (such as an over-the-air (OTA) Update application), and 10 dB antenna isolation. In this exemplary embodiment, there would be seventy eight graphs, which are preferably stored in database 305 in a form suitable for processor 303 to read and perform interference methods 304. Interpolation may be used to account for frequencies, data profiles and signal strengths that are between those stored in database 305.

In an exemplary embodiment, the full data rate graph would have the smallest noninterference range. Using the parameters above, it would be determined if the converged LMR/LTE communication device is in that noninterference range. If it is not, the current parameters would be compared against each of the graphs for this LMR frequency and LTE band combination. Once the parameters indicate that the converged LMR/LTE communication device is located within a noninterference range for a graph, preferably set the bit rate to the corresponding bit rate.

Upon reaching the graph with the minimum useable data rate, if the converged LMR/LTE communication device is not within the noninterference range on this graph, set the LTE data rate to zero, effectively turning off LTE transmissions. This process would be repeated periodically, as the conditions can change over time.

Thus, interference is preferably managed without access to the LTE or LMR scheduling algorithms, without deactivating the LTE modem, and without switching bands or rerouting application data. In accordance with an exemplary embodiment, as converged LMR/LTE communication device 101 moves throughout the coverage area it will have more LTE throughput when it is closer to LMR and/or LTE base sites but will have only slightly reduced LMR audio quality because no more than 1% of the LTE messages impact the audio quality.

Figure 5:
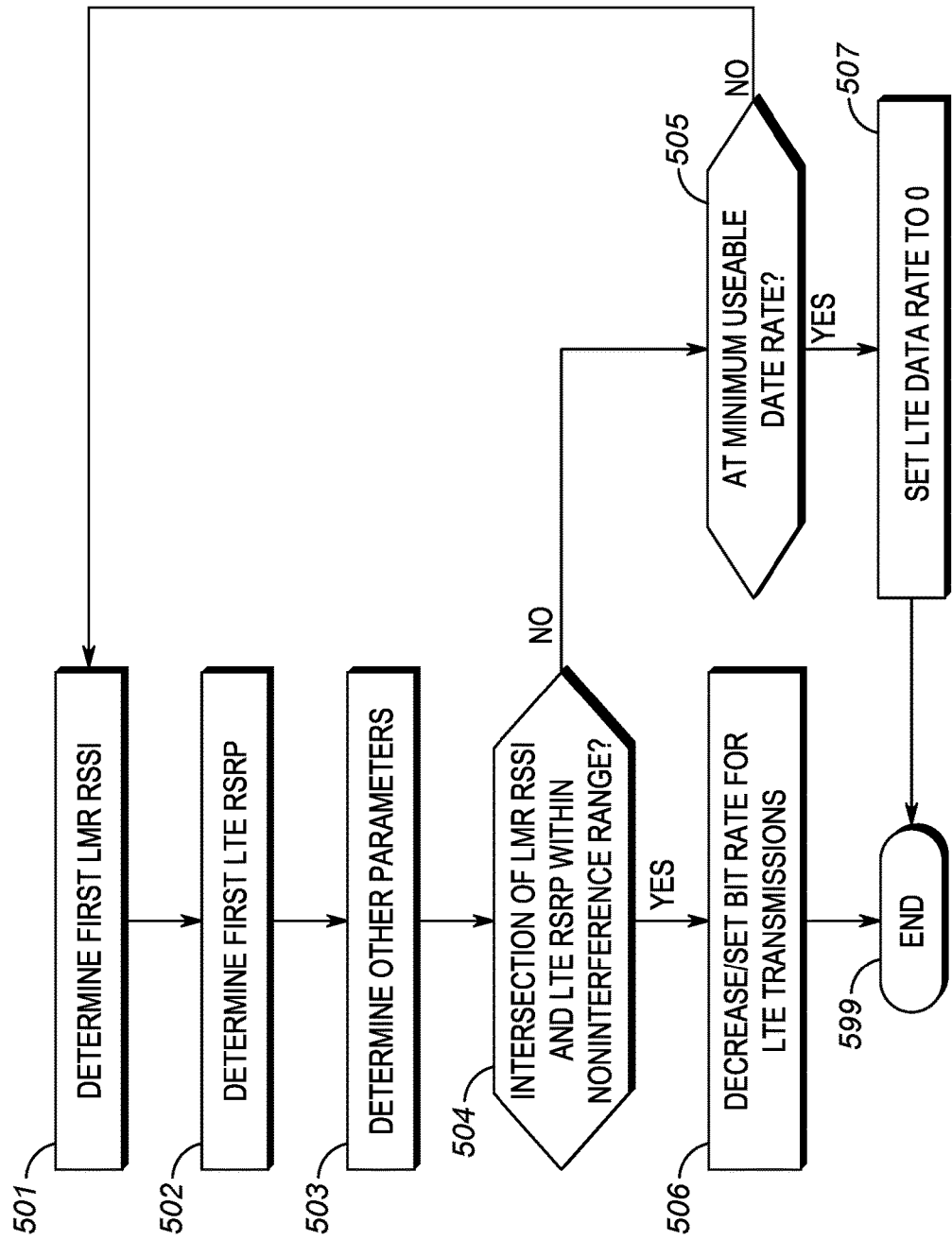
FIG. 5 depicts a flowchart in accordance with an exemplary embodiment of the present invention.

FIG. 5 depicts a flowchart in accordance with an exemplary embodiment of the present invention.

Converged LMR/LTE communication device 101 determines (501) a first LMR RSSI.

Converged LMR/LTE communication device 101 determines (502) a first LTE RSRP.

Converged LMR/LTE communication device 101 determines (503) other parameters necessary for this flowchart. In an exemplary embodiment, these parameters include antenna coupling and an allowable data rate.

Converged LMR/LTE communication device 101 determines (504) if the intersection of the first LMR RSSI and the first LTE RSRP on graph 400 is within the noninterference range 430 for the LMR frequency, the LTE band currently being used by converged LMR/LTE communication device 101, and the other parameters determined at step 503.

If converged LMR/LTE communication device 101 is within the noninterference range 430 as determined at step 504, converged LMR/LTE communication device 101 is in an area and with parameters that will allow converged LMR/LTE communication device 101 to transmit LTE data with an acceptable amount of interference. Converged LMR/LTE communication device 101 decreases (506) the bit rate for LTE transmissions to the level that was determined at step 503. The process then ends (599).

If converged LMR/LTE communication device 101 was not in a noninterference range as determined at step 504, then converged LMR/LTE communication device 101 is in an area that will not allow acceptable LTE transmissions. Converged LMR/LTE communication device 101 determines (505) if it is at a minimum useable data rate. If so, then no lower data rates for LTE transmissions will be acceptable, and since the current parameters do not allow acceptable LTE transmissions, converged LMR/LTE communication device 101 sets (507) the LTE data rate to zero. This effectively stops LTE transmission from converged LMR/LTE communication device 101. The process then ends (599).

If converged LMR/LTE communication device 101 determines at step 505 that it is not at the minimum useable data rate, then there are lower data rates that could be acceptable, and the process returns to step 501 to continue the process.

Figure 6:
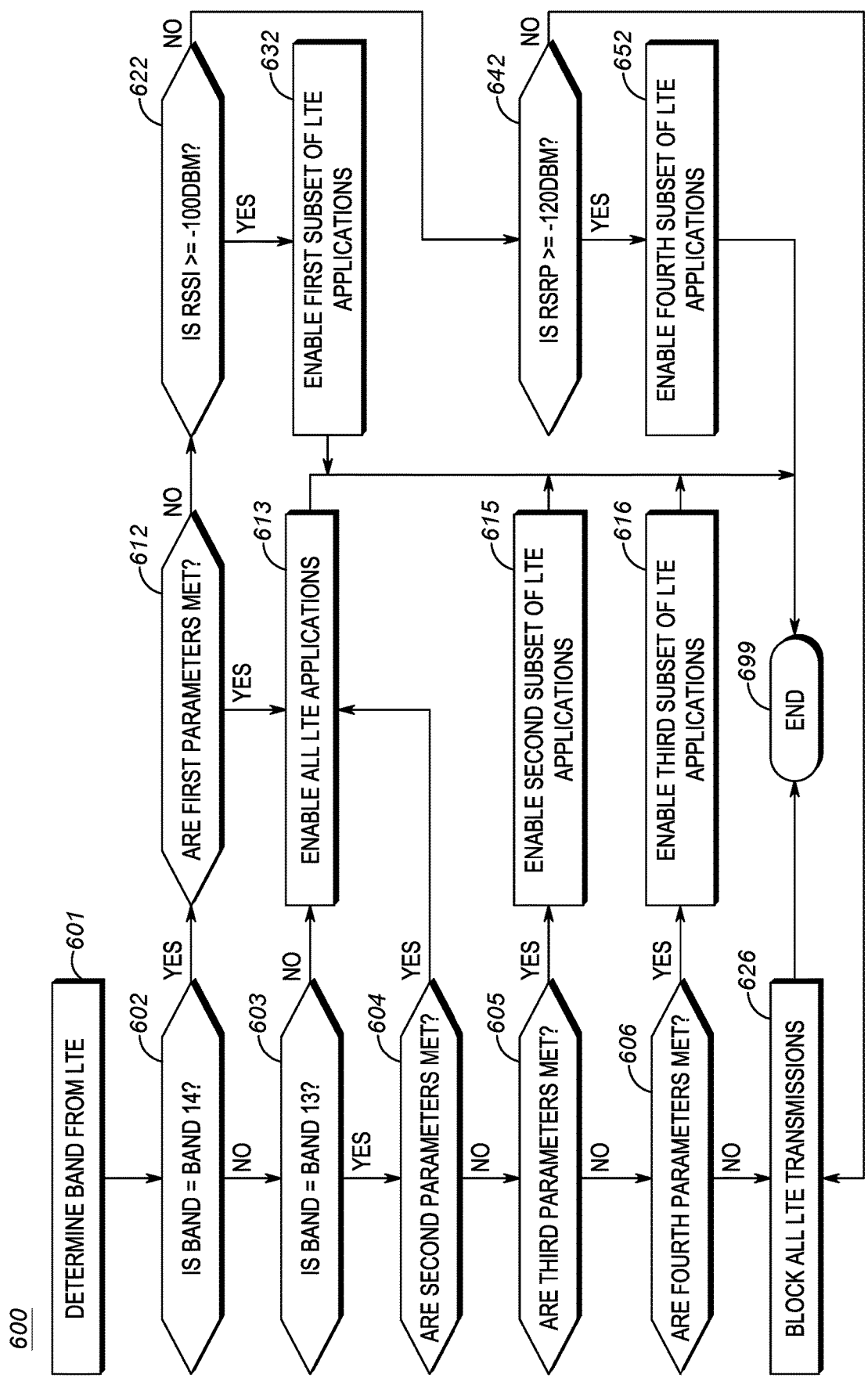
FIG. 6 depicts a flowchart in accordance with an exemplary embodiment of the present invention.

FIG. 6 depicts a flow chart of a method for minimizing interference in a converged LMR/LTE communications device that operates in a land mobile radio (LMR) narrowband communication system and a long term evolution (LTE) broadband communication system. The steps depicted below are preferably carried out by processor 303 in Converged LMR/LTE communication device 101.

FIG. 6 depicts an exemplary embodiment depicting three general conditions. In the first condition, generally depicted in decision blocks 602 and 612, the converged LMR/LTE communications device is operating at band 14 in the LTE broadband communication system and is operating in the 700 MHz band in the LMR narrowband communication system. In the second condition, generally depicted in decision blocks 603-606 and processes 613, 615, and 616, the converged LMR/LTE communications device is operating at band 13 in the LTE broadband communication system and is operating in the 700 MHz band in the LMR narrowband communication system. In the third condition, depicted in process 613, the converged LMR/LTE communications device is operating at band 4 in the LTE broadband communication system and is operating in the 800 MHz band in the LMR narrowband communication system.

Converged LMR/LTE communication device 101 determines (601) the LTE band currently being used. In an exemplary embodiment, converged LMR/LTE communication device 101 determines the LTE band currently being used by making a software system call to the operating system, for example, an Android operating system operating on processor 305.

Converged LMR/LTE communication device 101 determines (602) if the LTE band is Band 14. If the LTE band is Band 14, Converged LMR/LTE communication device 101 determines (612) if first parameters are met. In accordance with an exemplary embodiment, first parameters are met when the RSRP is greater than or equal to −95 dBm or if RSSI is greater than or equal to −100 dBm. RSRP is the power of the LTE Reference Signals spread over the full bandwidth and narrowband. A minimum of −20 dB SLNR (of the S-Synch channel) is needed to detect RSRP/RSRQ. At some point converged LMR/LTE communication device 101 is so far from the LTE site that the LTE signal has insufficient signal strength, which typically occurs at RSRP of around −120 dBm.

If the first parameters are met as determined in step 612, Converged LMR/LTE communication device 101 enables (613) all LTE applications. In an exemplary embodiment, this is accomplished by setting the uplink bit rate to unlimited. If the first parameters are not met as determined in step 612, Converged LMR/LTE communication device 101 determines (622) if the RSSI is greater than or equal to −100 dBm.

If the RSSI is greater than or equal to −100 dBm as determined at step 622, Converged LMR/LTE communication device 101 enables (632) a first subset of LTE Applications. In accordance with an exemplary embodiment, the first subset of LTE applications comprises small messages, Virtual Partner messages, streaming video uplinks, streaming voice uplinks, and Over-the-Air (OTA) updates. In a second exemplary embodiment, the first subset of LTE applications comprises LTE application that have an uplink bit rate less than 380 kbps. The process then ends (699).

If the RSSI is not greater than or equal to −100 dBm as determined at step 622, Converged LMR/LTE communication device 101 determines (642) if the RSRP is greater than or equal to −120 dBm.

If the RSRP is greater than or equal to −120 dBm as determined at step 642, Converged LMR/LTE communication device 101 enables (652) a fourth subset of LTE Applications. In accordance with an exemplary embodiment, Converged LMR/LTE communication device 101 enables small messages, streaming voice uplink, OTA Updates, and sets the uplink bit rate to 32 kbps. The process then ends (699).

If the RSRP is not greater than or equal to −120 dBm as determined at step 642, Converged LMR/LTE communication device 101 blocks (626) all LTE transmissions. In accordance with an exemplary embodiment, this is the equivalent of setting the uplink bit rate to zero, which means that all ports are blocked effectively blocked. The process then ends (699).

If the LTE band is not Band 14 as determined at step 602, Converged LMR/LTE communication device 101 determines (503) if the LTE band is Band 13. If the LTE band is not Band 13, Converged LMR/LTE communication device 101 enables (613) all LTE applications.

If the LTE band is not Band 14 as determined at step 602, Converged LMR/LTE communication device 101 determines (604) if second parameters are met. Second parameters are preferably met when the RSSI is greater than or equal to −80 dBm and if the RSRP is greater than or equal to −65 dBm or if the RSSI greater than or equal to −2.4 times the RSRP times −236 dBm and if the RSRP is less than or equal to −65 dBm.

If the second parameters are met as determined at step 604, Converged LMR/LTE communication device 101 enables (613) all LTE applications.

If the second parameters are not met as determined at step 604, Converged LMR/LTE communication device 101 determines (605) if third parameters are met. Third parameters are preferably met when the RSSI is greater than or equal to −90 dBm and the RSRP is greater than or equal to −65 dBm or the RSSI is greater than or equal to −2.0 time the RSRP −220 dBm and the RSRP is less than or equal to −65 dBm. If the third parameters are met as determined at step 605, Converged LMR/LTE communication device 101 enables (615) a second subset of LTE applications. In accordance with an exemplary embodiment, the second set of LTE applications comprises streaming voice uplinks, Virtual Partner messages, and OTA updates. In accordance with a second exemplary embodiment, the second subset of LTE applications comprises LTE applications that have an uplink bit rate of less than 32 kbps.

If the third parameters are not met as determined at step 605, Converged LMR/LTE communication device 101 determines (606) if fourth parameters are met. Fourth parameters are preferably met when the RSSI is greater than or equal to −1000 dBm and the RSRP is greater than or equal to −95 dBm or the RSSI is greater than or equal to −4.0 time the RSRP −220 dBm and the RSRP is less than or equal to −95 dBm.

If the fourth parameters are met as determined at step 606, Converged LMR/LTE communication device 101 enables (616) a third subset of LTE applications. In accordance with an exemplary embodiment the third subset of LTE applications comprises small messages. In accordance with a second exemplary embodiment, the third subset of LTE applications comprises LTE applications that have a bit rate less than 680 bps.

If the fourth parameters are not met as determined at step 606, Converged LMR/LTE communication device 101 blocks (626) all LTE transmissions. In accordance with an exemplary embodiment, this is the equivalent of setting the uplink bit rate to zero, which means that all ports are blocked effectively blocked. The process then ends (699).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for minimizing interference in a converged LMR/LTE communications device that operates in a land mobile radio (LMR) narrowband communication system and a long term evolution (LTE) broadband communication system, the method comprising:
   determining a first LMR received signal strength indicator (RSSI) at the converged LMR/LTE communications device;
   determining a first LTE Reference Symbol Receive Power (RSRP) at the converged LMR/LTE communications device;
   determining whether an intersection of the first LMR RSSI and the first LTE RSRP falls within an interference range on a predetermined graph, the predetermined graph based upon an LMR frequency band and an LTE frequency band that the converged LMR/LTE communications device is currently utilizing; and
   decreasing bit rate for LTE transmissions for the converged LMR/LTE communications device responsive to determining that the intersection of the first LMR RSSI and the first LTE RSRP is within the interference range.

2. The method of claim 1, wherein the step of decreasing comprises setting a capped bit rate for LTE transmissions for the converged LMR/LTE communications device.

3. The method of claim 2, wherein the capped bit rate is decreased to a predetermined bit rate, the predetermined bit rate limiting LTE uplink transmitted signal interference.

4. The method of claim 2, the method further comprising the step of utilizing the capped bit rate to limit the bit rate.

5. The method of claim 4, wherein the bit rate comprises a predetermined percentage of the capped bit rate.

6. The method of claim 1, wherein the step of decreasing comprises disabling an LTE application on the converged LMR/LTE communications device.

7. The method of claim 6, wherein the step of disabling an LTE application on the converged LMR/LTE communications device comprises disabling the LTE application using a destination IP address of the LTE application.

8. The method of claim 6, wherein the step of disabling an LTE application on the converged LMR/LTE communications device comprises instructing the LTE application to stop producing LTE traffic for a first period of time.

9. The method of claim 1, wherein the LMR frequency band comprises the 700 MHz band and wherein the LTE frequency band is band 14.

10. The method of claim 1, wherein the LMR frequency band comprises the 700 MHz band and wherein the LTE frequency band is band 13.

11. The method of claim 1, wherein the LMR frequency band comprises the 800 MHz band and wherein the LTE frequency band is band 5.

12. The method of claim 1, wherein the LTE frequency band comprises one of Band 5, Band 13, or Band 14.

13. The method of claim 12, the method further comprising the step of detecting that the converged LMR/LTE communications device has transitioned to a band other than one of Band 5, Band 13, or Band 14.

14. The method of claim 13, the method further comprising the step of increasing the bit rate for LTE transmissions for the converged LMR/LTE communications device.

15. The method of claim 1, wherein the LTE transmissions comprise location update data and non-location data, and wherein the step of decreasing the bit rate for LTE transmissions comprises decreasing the bit rate for the non-location data.

16. A converged LMR/LTE communications device for minimizing interference when operating in a land mobile radio (LMR) narrowband communication system and a long term evolution (LTE) broadband communication system, the converged LMR/LTE communications device comprising:
a processor that performs:
determining a first LMR received signal strength indicator (RSSI) at the converged LMR/LTE communications device;
determining a first LTE Reference Symbol Receive Power (RSRP) at the converged LMR/LTE communications device;
determining whether an intersection of the first LMR RSSI and the first LTE RSRP falls within an interference range on a predetermined graph, the predetermined graph based upon an LMR frequency band and an LTE frequency band that the converged LMR/LTE communications device is currently utilizing; and
decreasing bit rate for LTE transmissions for the converged LMR/LTE communications device responsive to determining that the intersection of the first LMR RSSI and the first LTE RSRP is within the interference range.

17. The converged LMR/LTE communications device of claim 16, wherein the step of decreasing comprises setting a capped bit rate for LTE transmissions for the converged LMR/LTE communications device.

18. The converged LMR/LTE communications device of claim 17, wherein the processor is further configured to utilize the capped bit rate to limit the bit rate, and wherein the bit rate comprises a predetermined percentage of the capped bit rate.

19. The converged LMR/LTE communications device of claim 16, wherein the step of decreasing comprises disabling an LTE application on the converged LMR/LTE communications device.

20. The converged LMR/LTE communications device of claim 16, wherein the LTE transmissions comprise location update data and non-location data, and wherein the step of decreasing the bit rate for LTE transmissions comprises decreasing the bit rate for the non-location data.

* * * * *